2,743,238
METHOD OF MAKING ELECTROLUMINESCENT ZINC SULFIDE PHOSPHOR

Brian Everard Hunt, Bushey Heath, and Alfred Hamilton McKeag, North Wembley, England, assignors to General Electric Company, a corporation of New York No Drawing. Application March 18, 1953,
Serial No. 343,248

Claims priority, application Great Britain March 26, 1952

2 Claims. (Cl. 252—301.6)

This invention relates to artificial luminescent materials, one of its objects being to provide a luminescent material possessing the property of electroluminescence, that is to say, of being excited to luminescence when placed in a fluctuating electric field, said material differing in its composition from previously known electroluminescent materials.

Electroluminescent materials are employed in devices, known as electroluminescent devices, which comprise luminescent materials associated with means for subjecting the material to the action of a fluctuating electric field. Such a device may, for example, comprise a layer of luminescent material sandwiched between two conducting plates, usually together with a dielectric material for insulating the plates, so as to be excitable to luminescence by the application of an alternating voltage between said plates, at least one of the plates being partly or wholly transparent for the emission of light from the device.

According to the present invention an artificial luminescent material suitable for use in an electroluminescent device comprises a matrix of zinc sulphide, activated by copper and manganese, the proportion of copper being in the range of 0.05% to 1% by weight of the material, and the proportion of manganese being in the range of 0.1% to 10% by weight of the material.

It is known that zinc sulphide alone, without the addition of any activator, is slightly excited by a fluctuating electric field, showing a weak bluish electroluminescence. It is also known that when activated by copper, zinc sulphide is much more strongly electroluminescent, the color of the luminescence being changed from blue to bluish-green or green by the addition of copper. The addition of manganese alone to zinc sulphide has little effect with regard to the electroluminescent properties of the latter. However, zinc sulphide activated by both copper and manganese in accordance with the present invention is strongly electroluminescent, the addition of manganese to the copper-activated material resulting in a shift in the color of luminescence toward the red end of the spectrum. Thus, the materials of the invention, when excited by a fluctuating electric field, show colors of luminescence ranging from bluish-green through shades of bluish-white, pinkish-white and yellow to orange, depending upon the amounts of copper and manganese present. The proportion of copper in the material is preferably not greater than 0.4% by weight, and the proportion of manganese present is preferably not greater than 4.0% by weight.

The color of electroluminescence shown by any specific material in accordance with the invention depends also to a minor extent on the frequency of the oscillations producing the exciting field, tending to shift toward the blue end of the spectrum with increasing frequency. Also, as usual with electroluminescent materials, the brightness of the luminescence increases with both increasing voltage and increasing frequency of the exciting oscillations.

The zinc sulphide employed for the preparation of the luminescent materials of the invention is preferably prepared by precipitation from aqueous solutions of zinc salts, such as zinc sulphate, by means of ammonium sulphide or hydrogen sulphide. The precipitated zinc sulphide is washed thoroughly and dried before use. The luminescent material may be prepared by heating the dried precipitated zinc sulphide in admixture with zinc oxide and with the required small quantities of suitable compounds of copper and manganese, for example copper sulphate and manganese sulphide.

We have found that the brightness of electroluminescence of the product is improved by including a considerable amount of zinc oxide in the mixture of zinc sulphide and compounds of copper and manganese, the zinc oxide being introduced into the mixture before or during the heating. The proportion of zinc oxide thus fired with the zinc sulphide and the activator compounds is not critical and may suitably be about a third of the weight of the zinc sulphide.

Accordingly, in a preferred method of manufacturing a luminescent material in accordance with the invention, dried precipitated zinc sulphide is mixed with about a third of its weight of zinc oxide, and small proportions of compounds of copper and manganese and of a suitable flux, preferably a halide salt such as zinc chloride, these materials being ground together, and the mixture is heated in a closed tube at a temperature within the range of 700° C. to 1000° C. for a period of time depending upon the temperature used, for example for 10 to 15 hours at temperatures up to about 850° C., for 6 hours at 900° C. and for 3 hours at 1000° C. After cooling, the fired material is washed with a 10% (by volume) solution of acetic acid, then with distilled water and is then dried; this treatment may be followed by washing with dilute ammonia, and again washing with distilled water and drying. The proportions of the compounds of copper and manganese included in the initial mixture are preferably such that the weight of copper present in the mixture is in the range of 0.1% to 0.25%, and the weight of manganese present in the mixture is in the range of 0.1% to 2.5% of the combined weights of the zinc sulphide and zinc oxide present in said mixture.

As an alternative method of introducing zinc oxide into the mixture to be heated, instead of mixing zinc oxide with the zinc sulphide initially, a proportion of the zinc sulphide may be converted to zinc oxide by controlled oxidation during the firing process.

Preferably, the fired material is washed, for example with acetic acid, to a sufficient extent to remove substantially all of the zinc oxide which is in admixture with the activated zinc sulphide. It is possible that even after thorough washing a small amount of zinc oxide remains incorporated in the zinc sulphide matrix, but we have not yet been able to ascertain whether or not there is any residual zinc oxide present. Moreover, copper which has not been incorporated into the zinc sulphide lattice during the heating may also be removed during the washing steps.

In a modified method of preparing the luminescent materials of the invention, the copper and manganese activators may be introduced successively instead of together. Thus, a copper compound may be included in the initial mixture with zinc sulphide and, preferably, zinc oxide, this mixture being fired, then cooled and ground, and then mixed with a manganese compound and refired, the remaining steps in the treatment of the material being as described above.

A range of colors of luminescense which can be obtained with different proportions of copper and manganese included in the initial mixture is indicated in the following table. An approximate indication of the intensities of the luminescense obtained in each case (weak, moderate or strong) is also given in the table. All the materials shown in the table were obtained by firing a mixture containing an addition of zinc oxide equal to a third of the weight of the zinc sulphide.

*Table*

| Manganese—Percent by weight of ZnS and ZnO in initial mixture | Copper—Percent by weight of ZnS + ZnO in initial mixture | | |
|---|---|---|---|
| | 0.05 | 0.1 | 0.25 |
| 0.5 | Weak white | Moderate yellow-green. | Moderate blue-green. |
| 1.0 | | Strong orange-yellow. | Moderate yellow. |
| 2.0 | Moderate orange. | Moderate yellow. | Do. |
| 2.5 | | Weak orange-red. | Strong yellow. |

It will be understood that all the materials used in the preparation of the luminescent materials of the invention must be of a high degree of purity, as is usual in the manufacture of luminescent materials.

The luminescent materials according to the invention are suitable for use in electroluminescent devices of known kind, and are particularly suitable for incorporation in a device of the kind described in co-pending British patent application No. 28,180/51 (corresponding to U. S. application Serial No. 323,116, filed November 28, 1952, H. C. Bate et al.), comprising luminescent material sandwiched between two conducting plates and wherein a layer of the luminescent material is located adjacent to one of the conducting plates and is separated from the other conducting plate by a layer of insulating material.

Some specific methods of manufacturing luminescent materials in accordance with the invention will now be described by way of example.

*Example 1*

The zinc sulphide employed in the manufacture of the luminescent material of this example is prepared by precipitation by hydrogen sulphide from an aqueous solution of zinc sulphate, and the manganese sulphide employed for the introduction of the manganese activator is prepared by precipitation by hydrogen sulphide from an aqueous solution of manganese chloride.

For the production of the luminescent material an initial mixture containing 1% of manganese, 0.1% of copper, and a proportion of zinc oxide equal to one-third of the weight of zinc sulphide, is prepared by milling together the following constituents:

| | Grams |
|---|---|
| Zinc sulphide (ZnS) | 75 |
| Zinc oxide (ZnO) | 25 |
| Zinc chloride (ZnCl$_2$) | 1 |
| Manganese sulphide (MnS) | 1.58 |
| Copper sulphate (CuSO$_4$5H$_2$O) | 0.393 |

The copper sulphate is added to the mixture in the form of a 1% solution in water.

The milled mixture is dried and reground, and is then heated at 850° C. for 15 hours in a silica tube closed at both ends, one being closed with a rubber bung which is fitted with a Bunsen valve, in order to prevent air from entering the tube while allowing air and water vapor to be expelled on heating. The material is cooled and is then removed from the silica tube and is washed with a litre of 10% (by volume) acetic acid, the acetic acid being left in contact with the material for 24 hours. The acetic acid is filtered off and the solid material is washed with distilled water and dried.

The material thus prepared, dispersed in a dielectric medium consisting of silicone DC200, which has a viscosity of 100 centistokes, and placed between plates of tin-treated conducting glass together with an insulating sheet of mica one-thousandth of a millimeter thick, the tin surfaces of the plates being 0.1 mm. apart, shows a strong orange-yellow fluorescence when an alternating potential of 1000 volts at a frequency of 400 cycles per second is applied between the plates.

*Example 2*

A luminescent material is prepared by a method similar to that described in Example 1, with the exception that the amount of manganese sulphide used is 1 gram, so that the proportion of manganese in the initial mixture is 0.63% by weight.

This material shows a pinkish-white fluorescence when excited by an alternating potential of 1000 volts at a frequency of 400 cycles per second, under the same conditions as those described in Example 1.

*Example 3*

The starting constituents are the same, and in the same proportions, as those used in Example 1. The method of preparation of the material, however, differs from that described in the previous examples in that the copper and manganese activators are introduced in two separate stages in the firing process. Thus, the manganese sulphide is omitted from the mixture initially fired, which however contains the copper sulphate: this initial firing is carried out for 15 hours at 850° C. The fired material is ground and mixed with the manganese sulphide, and this mixture is fired for a further 15 hours at 850° C.

The material thus produced shows a strong yellow fluorescence when excited by an alternating potential of 1000 volts at a frequency of 400 cycles per second, under the conditions described in Example 1.

*Example 4*

The starting materials employed are the same as in Example 1, but the amounts of manganese sulphide and copper sulphate used are increased respectively to 3.95 grams and 0.98 gram, to give an initial mixture containing 2.5% by weight of manganese and 0.25% by weight of copper. The material is prepared by the method described in Example 3, and the product shows a strong yellow fluorescence when excited by an alternating potential of 1000 volts at a frequency of 400 cycles per second, under the conditions described in Example 1.

All the materials prepared in accordance with the above examples, when tested under similar conditions but excited by the main voltage of 240 volts, 50 cycles, show weaker fluorescence of a slightly redder color than when excited by the higher voltage and at the higher frequency.

What we claim as new and desire to secure by Letters Patent of the United States is:

1. The method of manufacturing an electroluminescent material which comprises firing at a temperature in the range of 700° C. to 1000° C. a mixture consisting essentially of zinc sulphide and approximately one-third its weight of zinc oxide with zinc chloride flux and activator compounds of copper and manganese sufficient to furnish, by weight of the mixture, 0.1% to 0.25% copper and .1% to 2.5% manganese and, after cooling, chemically removing free zinc oxide by washing the material with a solution of acetic acid.

2. The method of manufacturing an electroluminescent material which comprises firing at a temperature in the range of 700° C. to 1000° C. a mixture consisting essentially of zinc sulphide and approximately one-third its weight of zinc oxide with approximately 1% by weight of zinc chloride flux and manganese sulphide and copper sulphate sufficient to furnish, by weight of the mixture, .05% to 1% copper and .1% to 10% manganese and, after cooling, chemically removing free zinc oxide by washing the material with a solution of acetic acid.

(References on following page)

References Cited in the file of this patent

UNITED STATES PATENTS

| | | |
|---|---|---|
| 1,944,281 | Stephens | Jan. 23, 1934 |
| 2,447,322 | Fonda | Aug. 17, 1948 |

FOREIGN PATENTS

| | | |
|---|---|---|
| 873,860 | France | July 22, 1942 |

OTHER REFERENCES

Destriau: Article in Phil. Magazine, vol. 38, 1947, page 726.